(12) United States Patent
Martinez De La Cruz et al.

(10) Patent No.: US 12,101,629 B2
(45) Date of Patent: Sep. 24, 2024

(54) TECHNIQUE FOR CERTIFICATE HANDLING IN A CORE NETWORK DOMAIN

(71) Applicant: Telefonaktiebolaget LM Ericsson (publ), Stockholm (SE)

(72) Inventors: Pablo Martinez De La Cruz, Madrid (ES); Francisco Javier Garcia Garcia, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 226 days.

(21) Appl. No.: 17/627,257

(22) PCT Filed: Sep. 3, 2019

(86) PCT No.: PCT/EP2019/073411
§ 371 (c)(1),
(2) Date: Jan. 14, 2022

(87) PCT Pub. No.: WO2021/008716
PCT Pub. Date: Jan. 21, 2021

(65) Prior Publication Data
US 2022/0264301 A1    Aug. 18, 2022

(30) Foreign Application Priority Data
Jul. 17, 2019 (EP) .................................. 19382607

(51) Int. Cl.
*G06F 7/04* (2006.01)
*G06F 15/16* (2006.01)
(Continued)

(52) U.S. Cl.
CPC ......... *H04W 12/069* (2021.01); *H04L 63/166* (2013.01); *H04W 12/04* (2013.01); *H04W 12/30* (2021.01); *H04W 12/69* (2021.01)

(58) Field of Classification Search
CPC ... H04W 12/069; H04W 12/30; H04W 12/04; H04W 12/69; H04L 63/166
(Continued)

(56) References Cited

U.S. PATENT DOCUMENTS

| 10,057,243 B1 | 8/2018 | Kumar et al. |
| 2015/0095995 A1* | 4/2015 | Bhalerao ............. H04L 63/0823 726/6 |

(Continued)

FOREIGN PATENT DOCUMENTS

| CN | 103891329 A | 6/2014 |
| CN | 105284091 A | 1/2016 |

(Continued)

OTHER PUBLICATIONS

Chinese Office Action and English summary dated May 24, 2023 for Application No. 201980097226.9, consisting of 10 pages.
(Continued)

*Primary Examiner* — Brandon Hoffman
*Assistant Examiner* — Samuel Ambaye
(74) *Attorney, Agent, or Firm* — Weisberg I.P. Law, P.A.

(57) ABSTRACT

A network repository function, NRF, in a core network domain of a mobile communication network is provided, wherein the NRF is configured to register network function, NF, profiles for NF discovery, and wherein NF certificates have been issued to the NFs, each NF certificate including a public key of the respective NF and at least one signature of at least one certification authority, CA. The NRF is
(Continued)

configured to receive, from a registering NF having an NF certificate, profile information comprising an NF identity of the registering NF, an NF type of the registering NF, and at least one CA certificate of at least one CA that signed the NF certificate issued to the registering NF. The NRF is further configured to store the received profile information in a repository.

18 Claims, 8 Drawing Sheets

(51) Int. Cl.
  *H04L 9/40* (2022.01)
  *H04L 29/06* (2006.01)
  *H04W 12/04* (2021.01)
  *H04W 12/069* (2021.01)
  *H04W 12/30* (2021.01)
  *H04W 12/69* (2021.01)

(58) Field of Classification Search
  USPC .............................................................. 726/5
  See application file for complete search history.

(56) References Cited

U.S. PATENT DOCUMENTS

| | | | |
|---|---|---|---|
| 2017/0012968 A1* | 1/2017 | Feng | G06F 8/63 |
| 2019/0251241 A1* | 8/2019 | Bykampadi | H04W 12/009 |
| 2020/0028920 A1* | 1/2020 | Livanos | H04W 8/26 |

FOREIGN PATENT DOCUMENTS

| | | |
|---|---|---|
| CN | 109391592 A | 2/2019 |
| WO | 2019076634 A1 | 4/2019 |

OTHER PUBLICATIONS

International Search Report and Written Opinion dated Mar. 19, 2020 for International Application No. PCT/EP2019/073411 filed Sep. 3, 2019, consisting of 10-pages.

3GPP TS 23.501 V15.4.0; 3rd Generation Partnership Project; Technical Specification Group Services and System Aspects; System Architecture for the 5G System; Stage 2 (Release 15), Dec. 2018, consisting of 140-pages.

3GPP TS 29.510 V16.0.0; 3rd Generation Partnership Project; Technical Specification Group Core Network and Terminals; 5G System; Network Function Repository Services; Stage 3 (Release 16), Jun. 2019, consisting of 136-pages.

3GPP TS 33.501 V15.3.1; 3rd Generation Partnership Project; Technical Specification Group Services and System Aspects; System Architecture and procedures for the 5G System; (Release 15), Dec. 2018, consisting of 181-pages.

3GPP TR 33.855 V1.6.0; 3rd Generation Partnership Project; Technical Specification Group Services and System Aspects; Security Aspects; Study on security aspects of the 5G Service Based Architecture (SBA) (Release 16), Jun. 2019, consisting of 82-pages.

Justin Burke et al.; The SPIFFE Identity and Verifiable Identity Document; Secure Production Identity Framework for Everyone; May 19, 2021, consisting of 7-pages.

X.509; Wikipedia; ITU-T; Oct. 14, 2019, consisting of 17-pages.

Japanese Office Action and English Summary dated Apr. 11, 2023 for Application No. 2022-502053, consisting of 6 pages.

3GPP TSG SA WG3 (Security) Meeting #90Bis S3-180680; Title: OAuth based service authorization framework for SBA; Source: Nokia; Document for: Approval; Agenda Item: 4.1.13.5, Date and Location: Feb. 26-Mar. 2, 2018, San Diego (US), consisting of 13 pages.

Japanese Office Action and English language summary dated Aug. 8, 2023 for Application No. 2022-502053, consisting of 6 pages.

* cited by examiner

TECHNIQUE FOR CERTIFICATE HANDLING IN A CORE NETWORK DOMAIN

CROSS-REFERENCE TO RELATED APPLICATIONS

This application is a Submission Under 35 U.S.C. § 371 for U.S. National Stage Patent Application of International Application No.: PCT/EP2019/073411, filed Sep. 3, 2019 entitled "TECHNIQUE FOR CERTIFICATE HANDLING IN A CORE NETWORK DOMAIN," which claims priority to European Application No.: 19382607.0, filed Jul. 17, 2019, the entireties of both of which are incorporated herein by reference.

TECHNICAL FIELD

The present disclosure generally relates to mobile communication systems, and in particular to a core network domain of a mobile communication network. In more detail, the disclosure relates to apparatuses providing network repository functions and network functions in a core network domain, to a core network domain system, to corresponding methods and to a computer program product.

BACKGROUND

The 3$^{rd}$ Generation Partnership Project (3GPP) is developing technical specifications (TSs) for 5$^{th}$ Generation (5G) communication systems. 3GPP TS 23.501 V15.4.0 (2018 December) defines architectural aspects of a 5G Service Based Architecture (SBA). According to this SBA, network function (NF) use service-based interactions to consume services from other NFs. The discovery of services and of NFs producing them is provided by a network repository function (NRF).

Service producing NFs register, update or deregister their profiles in the NRF. Service consuming NFs discover services offered by NF producer instances by querying the NRF about NF instances offering services of a given type. NFs may subscribe and unsubscribe to changes in the status of NFs registered in the NRF. Based on such subscriptions, the NRF will notify NFs of status changes of other NFs.

SBA security mechanisms are specified in 3GPP TS 33.501 V15.3.1. For example, Sect. 13.1 of this document defines that NFs shall support Transport Layer Security (TLS) with both server-side and client-side certificates. This TLS mode is usually referred to as mutual TLS (mTLS).

TLS uses X.509 certificates containing a public key and digitally signed by a certification authority (CA). The CA has a certificate, which may be signed by another CA. A root CA is a CA whose certificate is not signed by any other CA. A certificate chain begins with a root CA, includes all intermediate CAs (but not the root CA) and ends with the client or server certificate, each certificate being signed relatively to the public key which is encoded in the previous certificate.

A party receiving an X.509 certificate must validate it. The validation implies traversing the certificate chain and validating all the certificate signatures. When all signatures are valid, the certificate is considered to be valid.

When a certificate of a service consumer NF is successfully validated by a service producer NF, the service producer NF authenticates the service consumer NF. Then, the service producer NF needs to authorize the service consumer NF, i.e., check that the service consumer NF is entitled to consume services offered by the service producer NF.

According to TS 33.501, token-based authorization can optionally be used. When not used, the service producer NF shall check the service consumer NFs' authorizations based on local policies.

When using mTLS, life-cycle management of CA certificates becomes mandatory. Doing such management at scale is a complex task, requires costly integrations and introduces complexities. On the other hand, when token-based authorization is not used, and the authorization is based on local policies, access control lists (ACL) or equivalent mechanisms need to be configured in the service producer NFs and, upon instantiating a new NF instance in the network, the ACLs of all service producers NFs must be updated, which is also complex and costly.

SUMMARY

There is a need for a technique that provides an efficient handling of CA certificates in a core network domain.

According to a first aspect, an apparatus configured to provide a network repository function, NRF, in a core network domain of a mobile communication network is provided, wherein the NRF is configured to register network function, NF, profiles for NF discovery, and wherein NF certificates have been issued to the NFs, each NF certificate including a public key of the respective NF and at least one signature of at least one certification authority, CA. The apparatus is configured to receive, from a registering NF having an NF certificate, profile information comprising an NF identity of the registering NF, an NF type of the registering NF, and at least one CA certificate of at least one CA that signed the NF certificate issued to the registering NF. The apparatus is further configured to store the received profile information in a repository.

As an example, the NF profiles of some or all NFs may each be extended by an attribute that contains one or more or all CA certificates that are required to validate the certificate of the NF associated with the corresponding NF profile. The validation may in particular occur during a mutual handshake procedure between a service consumer NF and a service producer NF. The handshake procedure may conform to the TLS protocol.

In one variant, the NF certificate issued to the registering NF further includes an NF identifier that is different from the NF identity of the registering NF. In this variant, the received profile information may further comprise the NF identifier. As an example, the NF profiles of some or all NFs may each be extended by a further attribute that contains the NF identifier of the NF associated with the corresponding NF profile.

The NF identifier may be used for validation purposes during a mutual handshake procedure between a service consumer NF and a service producer NF.

As an example, the NF identifier may be the particular identifier that is included in a subject field of the NF certificate. In some cases, the NF identifier may take the form of one of a fully qualified domain name, FQDN, and a secure production identity framework for everyone, SPIFFE, identifier.

As opposed to the NF identifier, the "regular" NF identity may make an NF (that is associated with the NF profile including this NF identity) discoverable or distinguishable in the core network domain.

The apparatus may be configured to receive a discovery request indicating at least an NF type. In such an implementation, the apparatus may further be configured to access the repository to identify one or more NF profiles matching at least the indicated NF type and to send a discovery response including discovery information from the one or more matching NF profiles. The discovery information includes in some cases at least the one or more CA certificates stored for the respective NF profile.

The apparatus may further be configured to receive, from a first NF, an update request including updated CA certificate information. Then, the apparatus may update the profile information of the first NF based with the updated CA certificate information. In particular, the apparatus may be configured to identify one or more second NFs associated with the first NF via a subscription of notifications and send at least a portion of the updated CA certificate information to the one or more identified second NFs.

The apparatus may further be configured to receive, from a first NF, an update request including updated NF identifier information. Then, the apparatus may update the profile information of the first NF based with the updated NF identifier information. In particular, the apparatus may be configured to identify one or more second NFs associated with the first NF via a subscription of notifications and send at least a portion of the updated NF identifier information to the one or more identified second NFs.

According to a second aspect, an apparatus configured to provide a network function, NF, in a core network domain of a mobile communication network is provided, wherein an NF certificate has been issued to the NF, the NF certificate including a public key of the NF and at least one signature of at least one certification authority, CA. The apparatus of the second aspect is configured to obtain the at least one CA certificate of the at least one CA that signed the NF certificate issued to the NF, and to send profile information to a network repository function, NRF, configured to register NF profiles for NF discovery in the core network domain, the profile information comprising an NF identity of the registering NF, an NF type of the registering NF, and the at least one CA certificate.

The NF certificate issued to the registering NF may further include an NF identifier that is different from the NF identity of the registering NF. The received profile information may further comprise the NF identifier, for example in the form of an attribute (e.g., in addition to an attribute defining the at least one CA certificate).

The apparatus of the second aspect may be configured to send, to another NF, the NF certificate in a handshake procedure with the other NF. The handshake procedure may conform to TLS (e.g., mTLS).

The apparatus of the second aspect may be configured to send, to the NRF, a discovery request indicating at least an NF type. The apparatus may further be configured to receive, from the NRF, a discovery response including discovery information from one or more NF profiles matching at least the NF type, the discovery information including the at least one CA certificate stored for the respective NF profile (and, optionally, the associated NF identifier). The apparatus may store the discovery information in a storage.

In particular, the apparatus may be further configured to receive, from another NF for which discovery information has previously been received from the NRF, the NF certificate issued for that other NF, to read the at least one CA certificate included in the discovery information from the storage, and to validate the NF certificate using the CA certificate read from the storage. The NF certificate may be received in the context of a handshake procedure with the other NF (e.g., conforming to TLS).

The apparatus of the second aspect may be configured to extract a first NF identifier from the received NF certificate, to extract a second NF identifier from the profile information, and to validate the first NF identifier based on the second NF identifier. As an example, it may be validated that the first NF identifier and the second NF identifier are identical.

The apparatus of the second aspect may be configured to receive, from the NRF, at least a portion of updated CA certificate information for an NF that is associated with the receiving NF via a subscription of notifications and for which discovery information has been received and stored previously. In this case, the apparatus may further be configured to update the stored discovery information based on the received updated CA certificate information. The same procedure may be performed for updated NF identifier information.

The apparatus of the second aspect may be configured to determine updated CA certificate information for the NF and to send, to the NRF, an update message including the updated CA certificate information for the NF. The same procedure may be performed for updated NF identifier information.

In some implementations, the apparatus of the second is configured as a service consumer NF. In other implementations, it is configured as a service producer NF.

Also provided is a core network system comprising the apparatus of the first aspect (i.e., the NRF) and the apparatus of the second aspect (i.e., the NF).

Further presented is a method of providing a network repository function, NRF, in a core network domain of a mobile communication network, the NRF being configured to register network function, NF, profiles for NF discovery, wherein NF certificates have been issued to the NFs, each NF certificate including a public key of the respective NF and at least one signature of at least one certification authority, CA. The method comprises receiving, from a registering NF having an NF certificate, profile information comprising an NF identity of the registering NF, an NF type of the registering NF, and at least one CA certificate of at least one CA that signed the NF certificate issued to the registering NF. The method also comprises storing the received profile information in a repository.

The above method may be performed by the apparatus of the first aspect (i.e., the NRF).

Still further, a method is presented of providing a network function, NF, in a core network domain of a mobile communication network, wherein an NF certificate has been issued to the NF, the NF certificate including a public key of the NF and at least one signature of at least one certification authority, CA. The method comprises obtaining the at least one CA certificate of the at least one CA that signed the NF certificate issued to the NF, and sending profile information to a network repository function, NRF, configured to register network function, NF, profiles for NF discovery in the core network domain, the profile information comprising an NF identity of the registering NF, an NF type of the registering NF, and the at least one CA certificate.

The above method may be performed by the apparatus of the second aspect (i.e., the NF).

Also provided is a computer program product comprising program code portions configured to execute the method presented herein when the computer program product is executed by one or more processors. The computer program product may be stored on a computer readable recording medium or may be provided for download via a network connection.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
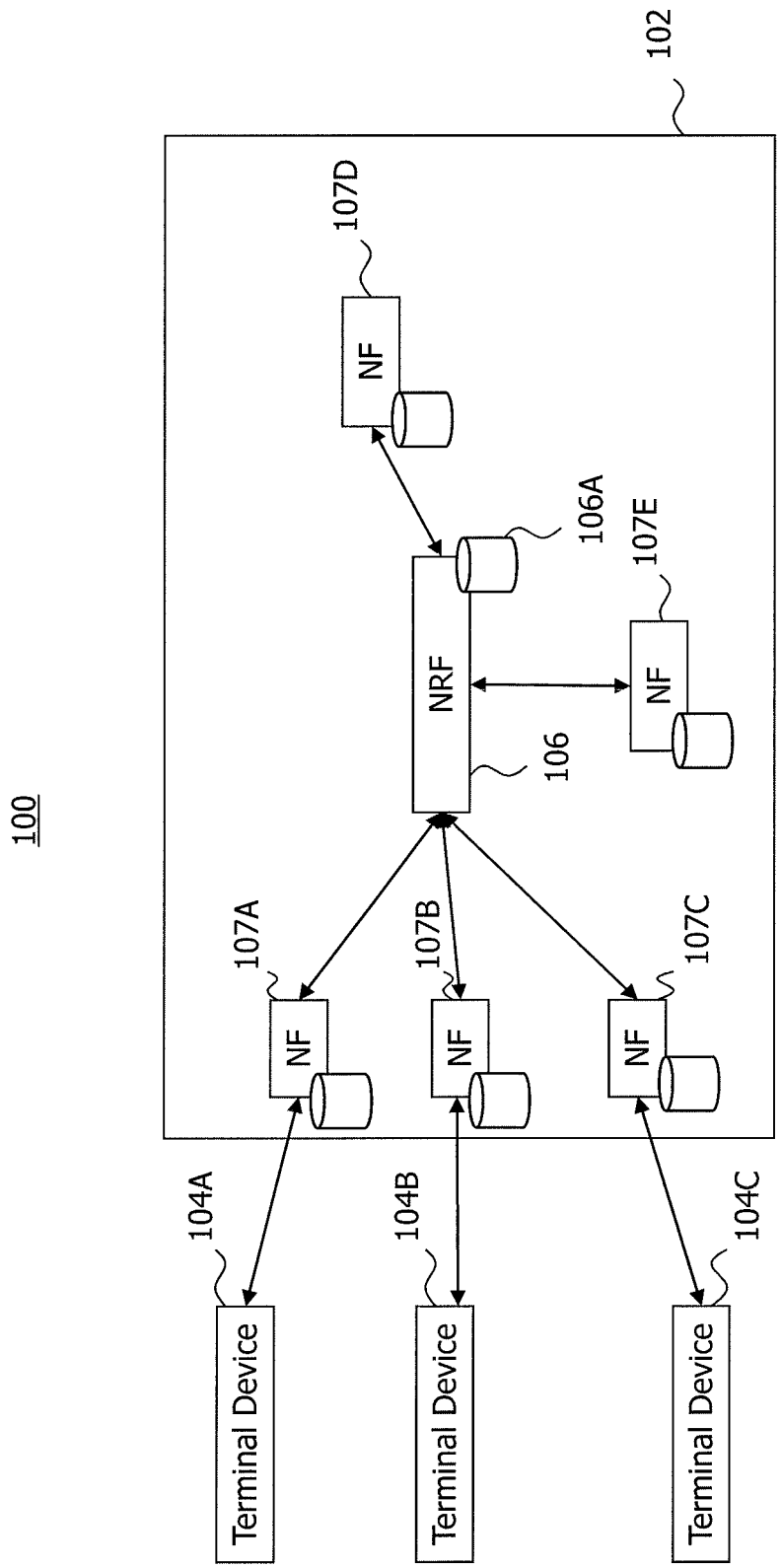
FIG. 1 is a diagram illustrating a network system embodiment of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on an exemplary core network configuration in accordance with 5G specifications, the present disclosure is not limited in this regard. The present disclosure could also be implemented in other cellular or non-cellular wireless communication networks having a core network domain.

While, therefore, the embodiments will specifically be described with reference to 5G core network entities, it will be appreciated that the present disclosure could also be implemented in other network types and by other network entities having similar functionalities. Moreover, while certificate-related information will be explained in the context of exemplary types of security protocols and handshake procedures such as TLS, it will be readily apparent that the present disclosure is not restricted in this regard.

Those skilled in the art will further appreciate that the steps, services and functions explained herein may be implemented using individual hardware circuits, using software functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary embodiments, the same reference numerals denote the same or similar components.

FIG. 1 illustrates an embodiment of a network system 100 in which the present disclosure can be implemented. As shown in FIG. 1, the network system 100 comprises a core network domain 102 operated by a mobile network operator. Different terminal devices 104, such as a UE-type terminal device 104A (e.g., a smartphone) and two IoT-type terminal devices 104B, 104C (e.g., a car and a wearable device), are serviced by the core network domain 102 via an access network domain. The access network domain is not shown in FIG. 1.

It will in the following be assumed that the core network domain 102 is compliant with 5G specifications. For this reason the following description of the core network domain 102 will make reference to typical 5G core network elements, without limiting the present disclosure thereto. The access network domain may also be compliant with 5G specifications and, optionally, additionally provide compatibility for 4G and 3G terminal devices.

The core network domain 102 comprises multiple network entities. In FIG. 1, primarily the network entities participating in NRF-related procedures are illustrated. Those network entities comprise different NFs 107 and a central NRF 106 configured to service the NFs 107 in regard to NF service discovery and discovery of the NFs 107 providing them.

In the context of the following embodiments, an NF 107 is a processing function that has a defined functional behaviour and defined interfaces. An NF 107 can be implemented either as a network element on a dedicated hardware, as a software instance running on a dedicated hardware, or as a virtualised function instantiated on an appropriate platform, e.g., on a cloud infrastructure. In the following, the term "NF" typically denotes an identifiable NF instance having a dedicated NF identity (and being of a dedicated NF type).

The NFs 107 illustrated in FIG. 1 can take various forms, such as user plane functions (UPFs) 107A, 107B, 107C. Each UPF-type NF 107A, 107B, 107C is associated with one of the terminal devices 104A, 104B, 104C, respectively, and handles the associated data traffic. It will be appreciated that each UPF 107A, 107B, 107C can in principle handle data traffic for multiple ones of the terminal devices 104A, 104B, 104C, depending on the network configuration.

The NFs 107A, 107B, 107C, and other NFs 107D, 107E, may register, update or deregister their respective NR profile in the NRF 106 and subscribe and unsubscribe at NRF 106 to be notified about status changes of NFs 107 registered at the NRF 106. For these (and other) procedures, the NRF 106 provides the so-called Nnrf_NFManagement service in an exemplary 5G implementation (see Sect. 5.2 of 3GPP TS 29.510 V.15.2.0 (2018 December)). Moreover, the NFs 107 may also query the NRF 106 to discover services provided by other NFs 107 and how to consume them. For these procedures, the NRF 106 provides the so-called Nnrf_NFDiscovery service in an exemplary 5G implementation (see Sect. 5.3 of TS 29.510).

Each of the NFs 107 is associated with an NF profile. The NF profile of a particular NF defines a plurality of NF attributes, such as a unique identity of the particular NF 107 as well as its type (that will be indicative of e.g., by the type of service provided by that NF). The NRF 106 comprises a data repository 106A for storing profile-related information received from the NFs 107. Each NF 107 also comprises a local data storage.

In accordance with Sect. 13.1 of TS 33.501, the NFs 107 shall support TLS with both server-side and client-side NF certificates. As understood herein, service producer NFs 107 are located on the server side, while service consumer NFs 107 are located on the client side. Each NF certificate includes a public key of the respective NF and at least one signature of at least one CA.

Figure 2B:
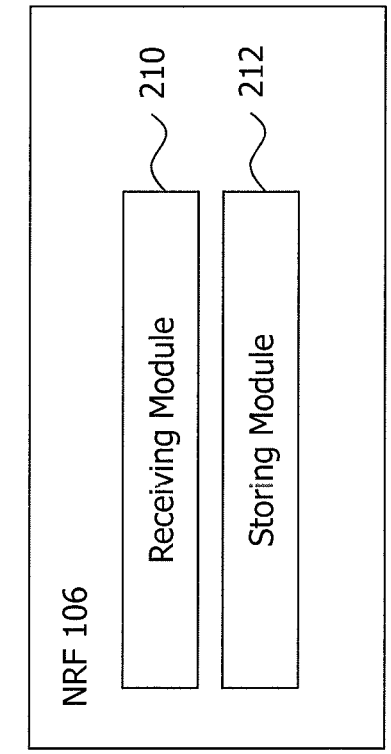
FIGS. 2A, 2B are block diagrams illustrating two NRF apparatus embodiments of the present disclosure.
Figure 2A:
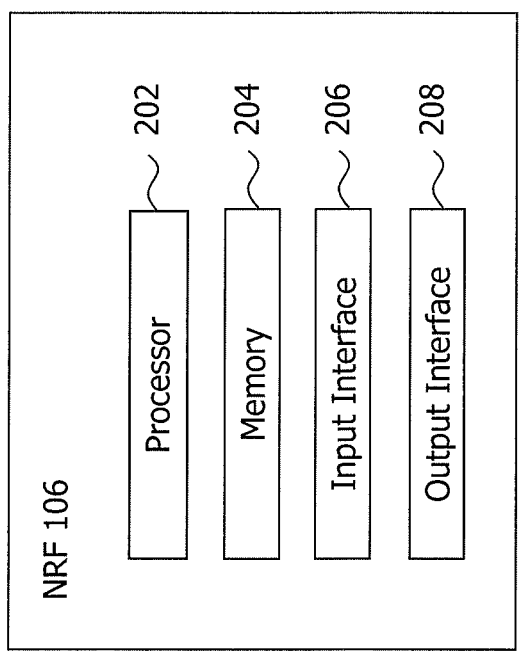

FIGS. 2A and 2B illustrate two embodiments of NRF 106 of FIG. 1. In the embodiment illustrated in FIG. 2A, NRF 106 comprises a processor 202 and a memory 204 coupled to the processor 202. NRF 106 further comprises an optional input interface 206 and an optional output interface 208. The memory 204 stores program code that controls operation of the processor 202. The memory 204, or a different storage, also stores the data repository 106B.

The processor 202 is adapted to receive, for example via the input interface 206 and from a registering NF having an NF certificate, profile information comprising an NF identity of the registering NF, an NF type of the registering NF, and at least one CA certificate of at least one CA that signed the NF certificate issued to the registering NF. The processor 202 is further configured to store the received profile information in the data repository 106A as illustrated in FIG. 1.

FIG. 2B shows an embodiment in which the NRF 106 is implemented in a modular configuration. As shown in FIG. 2B, the NRF 106 comprises a receiving module 210 configured to receive, from a registering NF, profile information comprising an NF identity of the registering NF, an NF type of the registering NF, and at least one CA certificate of at least one CA that signed the NF certificate issued to the registering NF. The NRF 106 further comprises a storing module 212 configured to store the received profile information in the data repository.

Figure 3B:
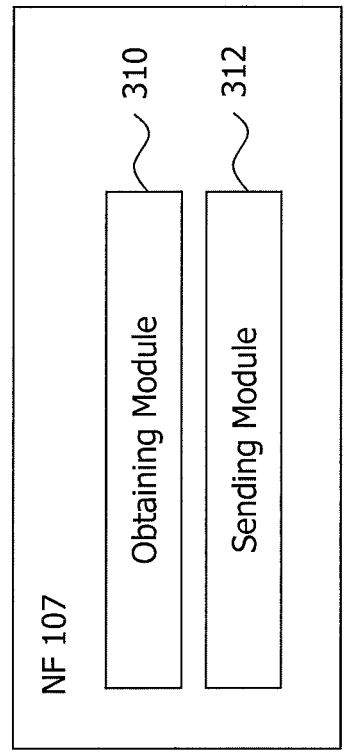
FIGS. 3A, 3B are block diagrams illustrating embodiments of two NF apparatuses in accordance with the present disclosure.
Figure 3A:
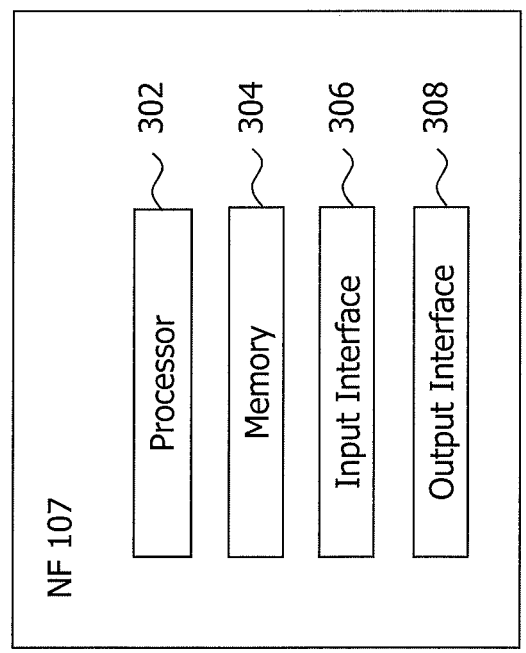

FIGS. 3A and 3B illustrate two embodiments of an NF 107 of FIG. 1 that is configured to register its NF profile at the NRF 106. In the embodiment illustrated in FIG. 3A, the NF 107 comprises a processor 302 and a memory 304 coupled to the processor 302. The NF 107 further comprises an optional input interface 306 and an optional output interface 308. The memory 304 stores program code that controls operation of the processor 302. The memory 304, or a different storage, may also store the CA certificate-related information for the NF 107 itself or as obtained from other NFs 107.

The processor 302 of the NF 107 is adapted to obtain, for example via the input interface 306, at least one CA certificate of at least one CA that signed an NF certificate issued to the NF 107. The processor 302 is further adapted to send, for example via the output interface 308, profile information to the NRF 106 that is configured to register NF profiles for NF discovery in the core network domain 102. The profile information that is sent comprises an NF identity of the registering NF 107, an NF type of the registering NF 107, and the at least one CA certificate.

FIG. 3B shows an embodiment in which the NF 107 is implemented in a modular configuration. As shown in FIG. 3B, the NF 107 comprises an obtaining module 310 configured to obtain the at least one CA certificate of the at least one CA that signed the NF certificate issued to the NF 107. The NF 107 further comprises a sending module 312 configured to send profile information to the NRF 106 that is configured to register NF profiles for NF discovery in the core network domain 102. The profile information comprises the NF identity of the registering NF 107, the NF type of the registering NF 107, and the at least one CA certificate.

Figure 4:
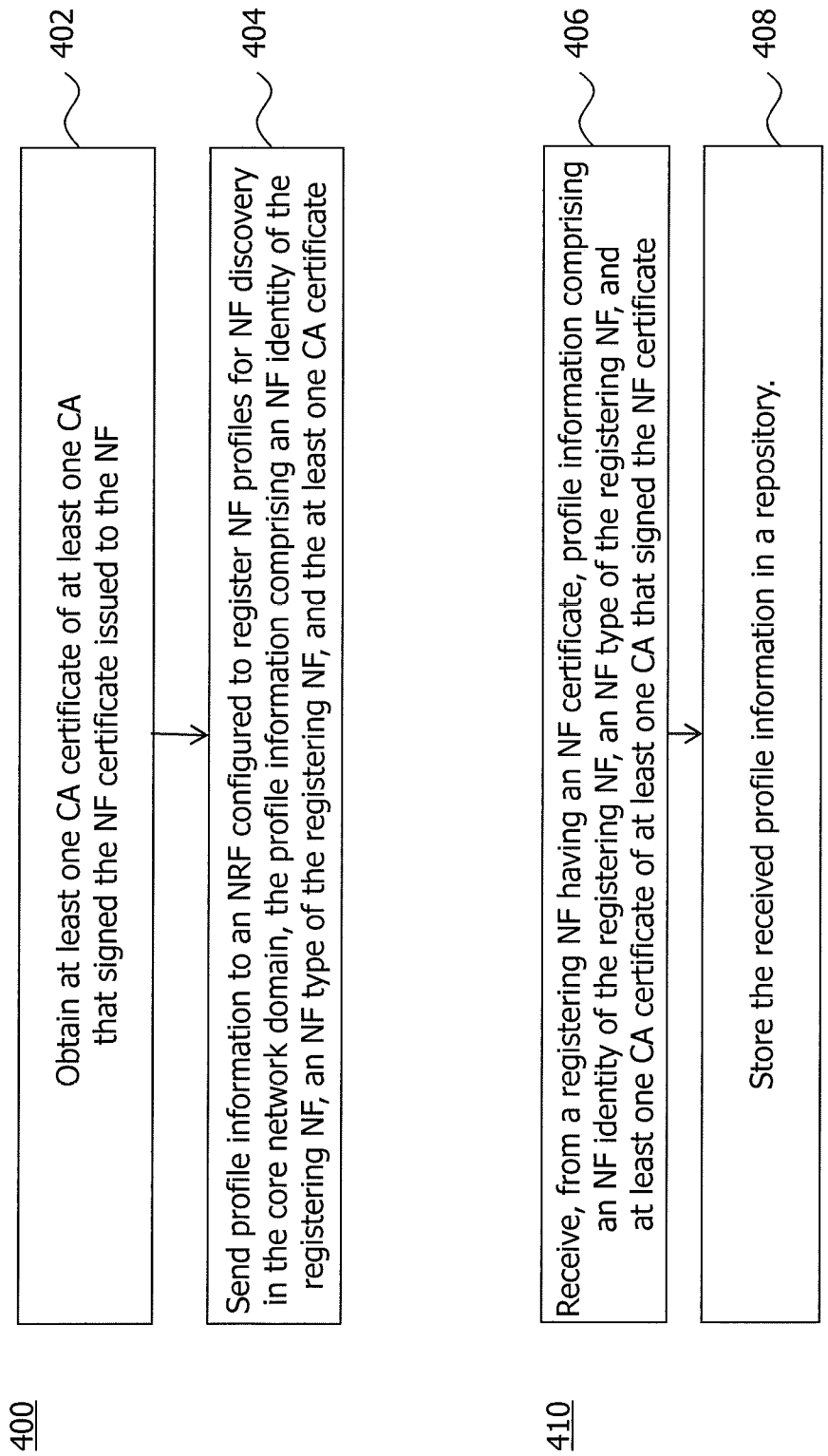
FIG. 4 illustrates flow diagrams of method embodiments of the present disclosure.

FIG. 4 illustrates in two flow diagrams 400, 410 method embodiments of the present disclosure. The method embodiment of flow diagram 400 may be performed by any of the NF embodiments of FIGS. 3A and 3B. The method embodiment of flow diagram 410 may be performed by any of the NRF embodiments of FIGS. 2A and 2B.

The method illustrated in flow diagram 400 comprises a step 402 of obtaining, by the registering NF 107, the at least one CA certificate of the at least one CA that signed the NF certificate issued to the registering NF 107. The at least one CA certificate has been obtained by the registering NF 107 as part of NF configuration. Although this configuration is vendor-specific, typically general purpose Configuration Management (CM) interfaces such as NETCONF are used for this purpose.

In step 404, the registering NF 107 sends profile information to the NRF 106 so that its NF profile can be registered there for NF discovery in the core network domain 102. The profile information comprises (at least) the NF identity of the registering NF 107, the NF type of the registering NF 107, and the at least one CA certificate obtained in step 402.

Turning now to the flow diagram 410, the NRF 106 receives in step 406, from the registering NF 107, the profile information sent in step 404. As explained above, the profile information comprises (at least) the NF identity of the registering NF 107, the NF type of the registering NF 107, and the at least one CA certificate of the at least one CA that signed the NF certificate issued to the registering NF 107. Then, in step 408, the NRF 106 stores the received profile information in its data repository 106A.

In the following, the above general embodiments will be described in greater detail with reference to the signaling embodiments illustrated in FIGS. 5a to 5D. These signaling diagrams are based on an exemplary 5G signaling implementation as defined, inter alia, in TS 29.510. The content of exemplary legacy NF profiles is defined in Sects. 6.1.6.2.2 and 6.1.6.2.3 of TS 29.510, and will be extended in the following embodiments by one or both of the following two attributes:

| Attribute name | Data type | P | Cardinality | Description |
| --- | --- | --- | --- | --- |
| caCertificates | array (string) | O | 0...N | Certificates for CAs used by the NF certificates |
| identifier | string | O | 0...1 | Identifier used by the NF |

The caCertificates attribute is an optional attribute that contains a list of up to N CA certificates that shall be used to verify the certificate used by an NF 107. The format of this attribute is an array of strings. Each string may include the contents of one CA certificate.

In one variant, each string represents a PEM (Privacy-enhanced Electronic Mail) Base64 encoded DER (Distinguishing Encoding Rules) certificate, enclosed between "---BEGIN CERTIFICATE---" and "---END CERTIFICATE---". Other encoding formats are possible for the caCertificates attribute, as long as they are compatible with the JSON (JavaScript Object Notation) encoding typically used for NF profiles.

The identifier attribute is an optional attribute that contains the identifier used to identify an NF instance in its CA certificate. The format is a string. It is to be noted that this identifier attribute is an attribute different from and provided in addition to the nfInstanceID attribute or the serviceInstanceID attribute in legacy NF profiles.

In one variant, the identifier attribute is an FQDN. FQDNs may be constructed as per section 28.2 of 3GPP TS 23.003 V15.6.0 (2018 December). An example of FQDN is:
<nf-instance-id>.<nf-instance-type>.5gc.mnc<MNC>.mcc<MCC>.3gppnetwork.org
where:
   <nf-instance-id> is a unique identifier for the NF instance. There shall not exist two equal identifiers for an NF type in a public land mobile network (PLMN)
   <nf-instance-type> is the NF type, e.g, Unified Data Management (UDM)

<MNC> and <MCC> correspond to the mobile network code (MNC) and mobile country code (MCC) of the operator's PLMN.

Figure 5A:
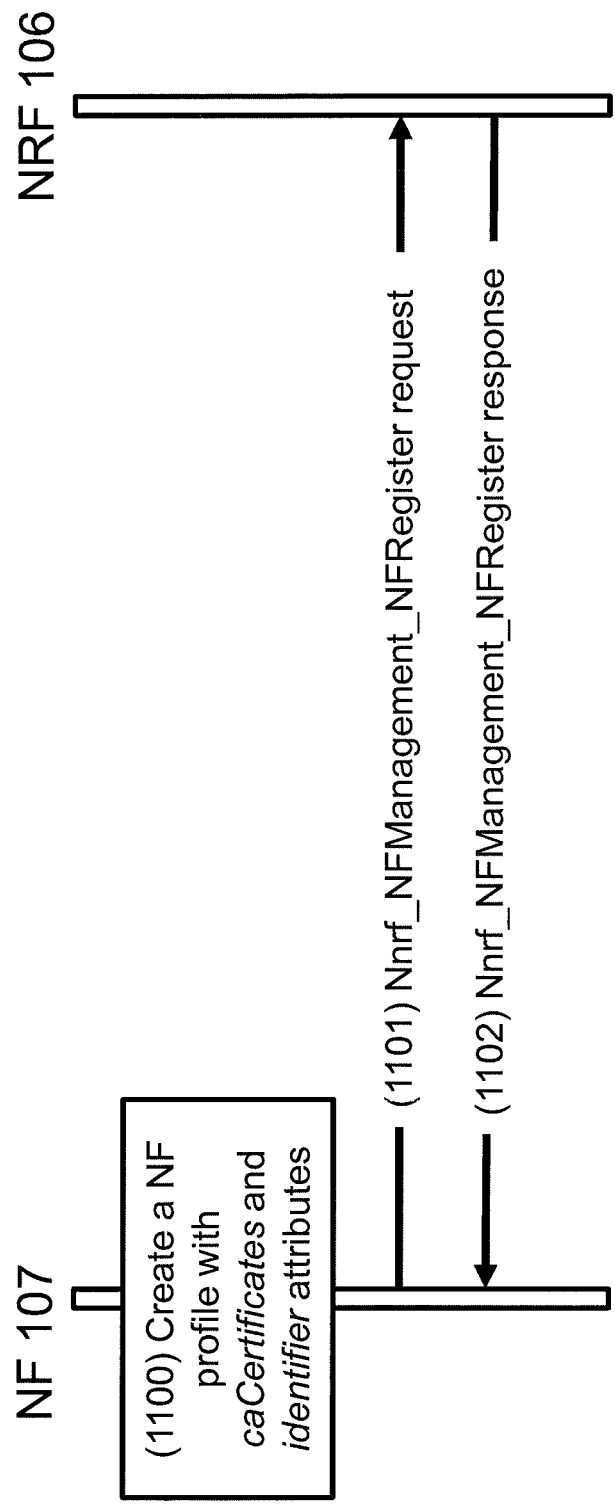
FIGS. 5A-D are schematic diagram signaling diagrams illustrating further embodiments of the present disclosure.

In another variant, the identifier attribute is a SPIFFE identifier. An example SPIFFE identifier is shown below:

spiffe://5gc.mnc<MNC>.mcc<MCC>.3gppnetwork.org/<nf-instance-type>/<nf-instance-id> where:
<nf-instance-id> is a unique identifier for the NF instance. There shall not exist two equal identifiers for an NF type in a PLMN.
<nf-instance-type> is the NF type, e.g, UDM.
<MNC> and <MCC> correspond to the MNC and MCC of the operator's PLMN. In a still further variant, the identifier attribute is an opaque value. An example of opaque identifier attribute is shown below:
36f01027-4d6f-45e6-8e60-1e14d464344e FIG. 5A depicts a signaling embodiment in the context of registering any of the NFs 107 illustrated in FIG. 1 at the NRF 106. The NF 107 depicted in FIG. 5A may be a service producer or a service consumer, or may take both roles dependent on the prevailing requirements.

As a precondition, it is assumed that the NF 107 has been provisioned, for example during configuration, with the root CA certificate and, optionally, one or more intermediate CA certificates that have been used to sign the certificate of the NF 107. This provisioning may have occurred in the context of step S402 illustrated in FIG. 4.

The signaling embodiment of FIG. 5A comprises the following steps:

In an initial step 1100, the NF 107 creates its NF profile. The NF profile includes, among others, its NF type (e.g., UDR), its unique NF identity (e.g., nfInstanceID or serviceInstanceID) and at least one of the following attributes:
  caCertificates attribute: contains the root and/or intermediate CA certificates that are required to validate the certificate of NF 107 (e.g., encoded as explained above).
  identifier attribute: contains an NF identifier (e.g., as explained above). In some variants, the NF identifier matches the value of the Subject Name or Subject Alternative Names fields of the certificate of the NF 107.

In some implementations, the identifier attribute may be omitted. In other implementations, the caCertificates attribute may be omitted. In case one of these attributes is omitted, certain security processes (as discussed below with reference to FIG. 5C) cannot be performed. As such, for maximum security, both attributes may be used by default.

In step 1101, the NF 107 registers itself in the NRF 106 by sending an Nnrf_NFManagement_NFRegister request (see step S404 in FIG. 4). The request includes the NF profile previously created in step 1100.

The NRF 106 receives the NF profile (see step S406 in FIG. 4) and stores the received NF profile in its data repository 106A (see step S408 in FIG. 4).

Then, in step 1102, the NRF 106 and returns a Nnrf_NFManagement_NFRegister response to the NF 107. This response informs the NF 107 that the NF profile has properly been received and stored by the NF 107.

Figure 5B:
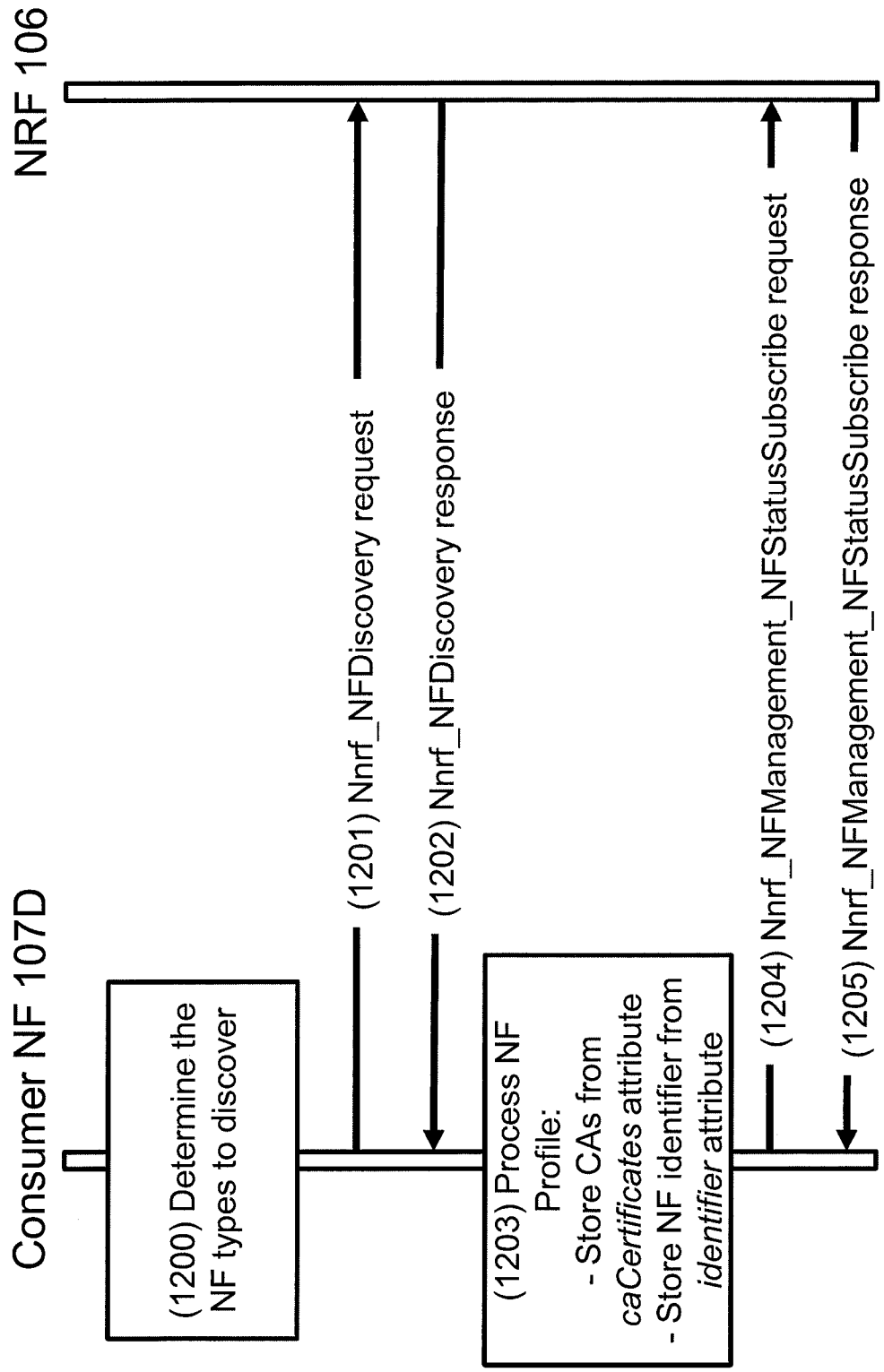

FIG. 5B depicts a signaling embodiment in the context of NF discovery by an NF 107 that assumes the role of a service consumer. In the following, it will exemplarily by assumed that NF 107D of FIG. 1 acts as a service consumer, whereas NF 107E acts as a service producer. As explained above with reference to FIG. 5A, the NRF 106 will have stored in its data repository 106A the NF profiles (with the associated NF types and CA certificates) of all the NFs 107 that can act as service producers for other NFs 107.

In step 1200, the service consumer NF 107D determines the one or more NF types (i.e., service types) it requires to interact with, and for each of them repeats steps 1201 to 1205.

In step 1201, the service consumer NF 107D sends an Nnrf_NFDiscovery request to the NRF 107. This request indicates at least a particular NF type as a selection criterion. In some cases, the request may include one or more further selection criteria, or other information.

Then, in step 1202, the NRF 106 consults its data repository 106A for matching NF profiles of one or more service producer NFs 107E and returns an Nnrf_NFDiscovery response. This response contains the NF profiles matching the one or more criteria indicated in step 1201. The NF profiles returned in step 1202 may include, inter alia, the respective caCertificates and identifier attributes. In this way, the service consumer NF 107D receives the one or more CA certificates stored for each service producer NF 107E in the data repository 106A of the NRF 106 for future use.

The service consumer NF 107D processes the received NF profiles in step 1203. For each NF profile, the service consumer NF 107D:
  extracts the contents of the caCertificates attribute, and for each CA certificate, stores the extracted content in a secure registry of the TLS implementation; and
  extracts the contents of the identifier attribute and stores it internally (and typically separately from the contents extracted from the caCertificates attribute).

In a further step 1204, the service consumer NF 107D sends an (optional) Nnrf_NFManagement_NFStatusSubscribe request to the NRF 106. In this subscription request, the service consumer NF 107D indicates an NF type, in order to receive changes in the status of service producer NFs 107E for which NF profiles have been obtained in step 1202, and to learn new ones matching the indicated NF type.

In step 1205, the NRF 106 processes the subscription request and returns an Nnrf_NFManagement_NFStatusSubscribe response. The subscription response notifies the service consumer NF 107D that the subscription request has properly been received and processed.

At the end of the signaling procedure illustrated in FIG. 5B, the service consumer NF 107D has all the NF identities, CA certificates and NF identifiers of all service producer NFs 107E that it potentially needs to consume services from. The same signaling procedure may be executed by a service producer NF 107E, this time indicating the NF types the service producer NF 107E shall provide its services to. At the end of the corresponding signaling procedure, the service producer NF 107E has all the NF identities, CA certificates and the NF identifiers of all service consumer NFs 107D that shall consume its services.

Some NFs 107 can have both service consumer and service producer roles simultaneously, for instance, UDM acts as a service produce towards an authentication server function (AUSF), and as a consumer towards a unified data repository (UDR). In such cases, the signaling procedure illustrated in FIG. 5B may be executed twice by a given NF 107 (once as a service consumer and once as a service producer).

Figure 5C:
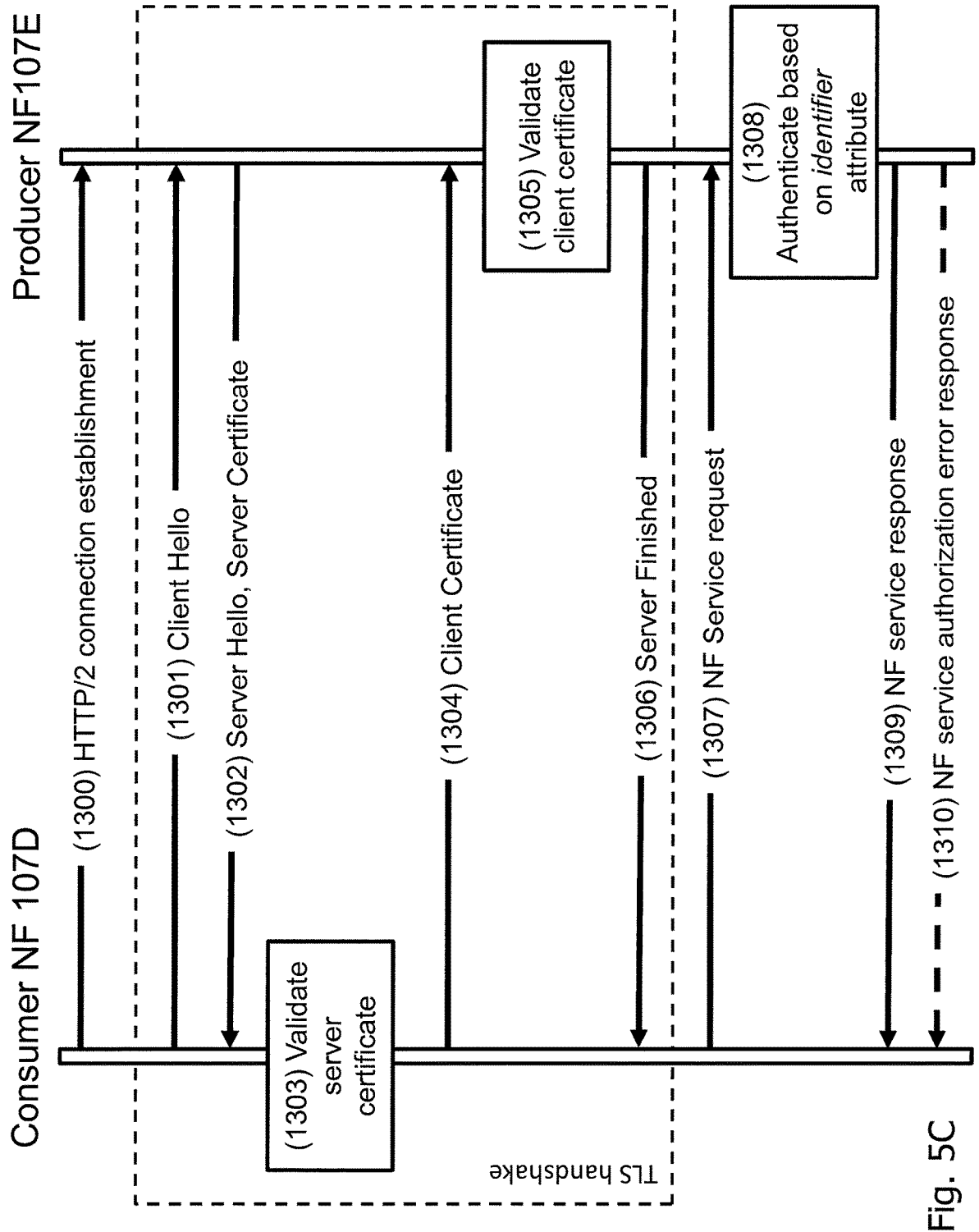

FIG. 5C depicts a signaling embodiment in the context of NF service invocation by a service consumer NF 107D relative to a service producer NF 107E. The service produce NF 107E has previously been discovered by the service consumer NF 107D using discovery/subscription signalling as illustrated in FIG. 5B.

In step 1300, the service consumer NF 107D initiates a hypertext transfer protocol 2 (HTTP/2) connection towards the service producer NF 107E. The connection is secured with mTLS, so the TLS handshake procedure begins (see box in dashed lines).

In step 1301, the service consumer NF 107D sends a Client Hello message to the service producer NF 107E, and in step 1302, the service producer NF 107E sends a Server Hello message to the service consumer NF 107E, including (among other parameters) the certificate of the service producer NF 107E ("server certificate" in FIG. 5C).

Then, in step 1303, the service consumer NF 107D validates the server certificate provided by the service producing NF 107E. In this context, the TLS implementation accesses the secure registry to fetch the one or more CA certificates that were stored in step 1203 of FIG. 5B for the service producer NF 107E. The verification as such is performed in accordance with the X.509 protocol, typically by traversing the certificate chain from the root CA certificate via the intermediate CA certificates to the NF certificate and validating all the certificate signatures, and will not be described in greater detail herein. It will in the following be assumed the validation has been successful as all signatures in the certificate chain could successfully be validated.

After successful validation, the service consumer NF 107D in step 1304 sends a message to the service producer NF 107E. This message includes, among other parameters, the certificate of the service consumer NF 107D ("client certificate" in FIG. 5C).

In step 1305, the service producer NF 107E (successfully) validates the client certificate provided by the service consumer NF 107D. To this end, the TLS implementation accesses the secure registry to fetch the one or more CA certificates that were stored in step 1203 of FIG. 5B for the service consumer NF 107D. The service producer NF 107E stores the client certificate details for later usage.

In step 1306, the service producer NF 107E sends a Server Finished message to the service consumer NF 107D and terminates the TLS handshake phase. From this point on, the HTTP/2 connection is secured, and the mTLS authentication has been successfully completed.

In step 1307, the service consumer NF 107D sends an NF Service request to the service produce NF 107E to consume one of its services.

In step 1308, the service producer NF 107E authorizes the service consumer NF 107D prior to enable consumption of its services. To do so, the service producer NF 107E:
  extracts the Subject Name and Subject Alternative Names fields from the client certificate as received and stored in steps 1304 and 1305, respectively; and
  iterates over the NF profiles of the NF types that consume its services (e.g., as previously received from the NRF 106 during the discovery signaling illustrated in FIG. 5B) and matches the identifier attribute in each NF profile with the Subject Name or Subject Alternative Name fields from the client Certificate If a match is found, the service consumer NF 107D has successfully been authorized, and the service producer NF 107E returns a service invocation response in step 1309. If, on the other hand, no match is found, the service consumer NF 107D is not authorized, and the service producer NF 107E returns an error response in step 1310. The error message indicates that the service request receive in step 1307 was not authorized.

It will be appreciated that steps 1301 to 1306 as well as steps 1307 to 1309 are based on the new caCertificates attribute and the new identifier attribute, respectively. In case only one of these attributes is implemented, there will still be implementation or security benefits compared to legacy implementations.

Figure 5D:
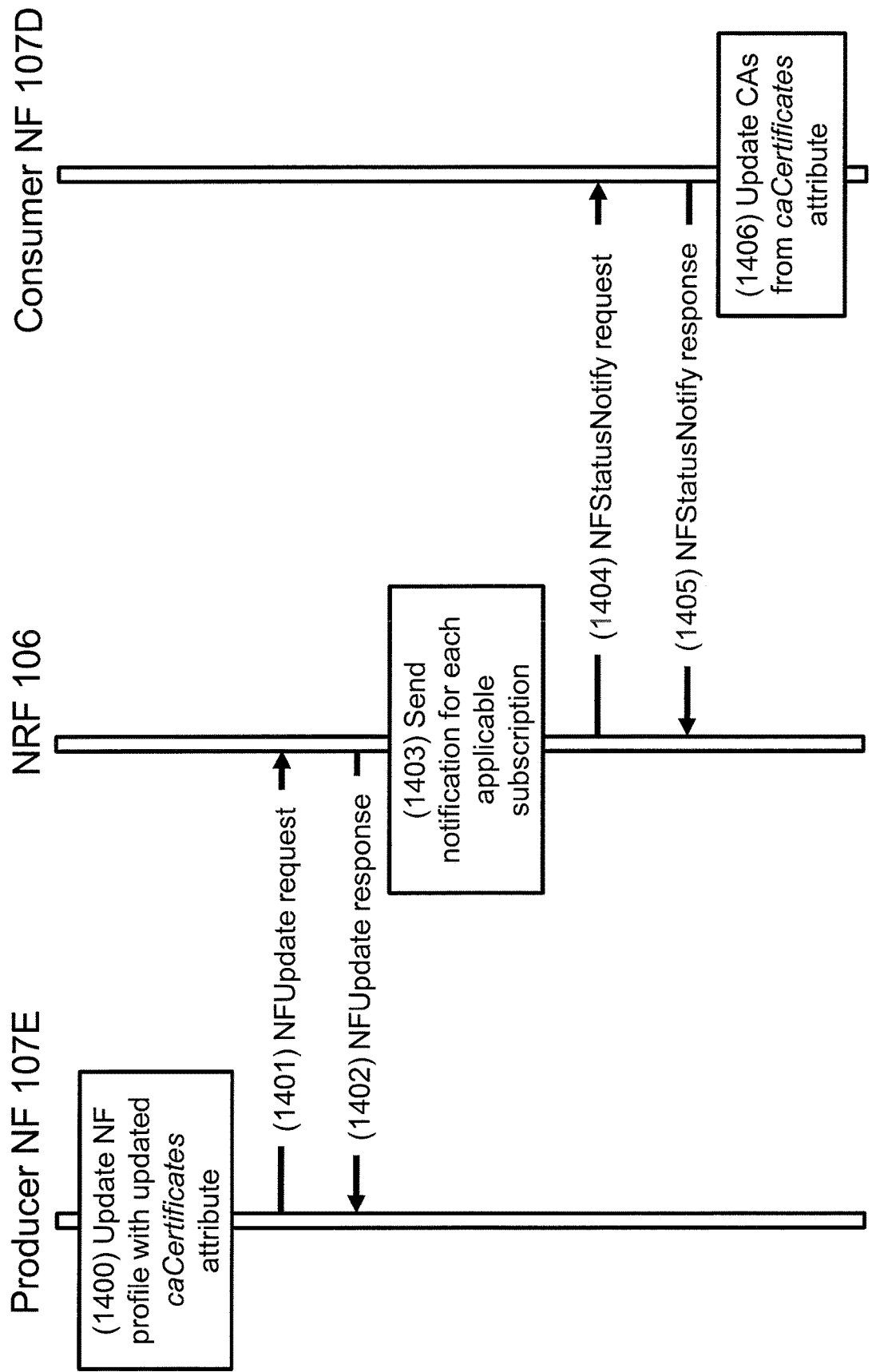

FIG. 5D depicts a signaling embodiment in the context of updating CA certificates (e.g., because of their expiry), which belongs to life-cycle management (LCM). The CA certificates in need of updating have previously been communicated in the core network domain 102 as discussed above with reference to FIGS. 5A and 5B. The same signaling procedure will be applied by each NF 107, independently of its role as a service consumer or a service producer. As a precondition of the signaling procedure illustrated in FIG. 5D, the NF 107 has been provisioned with at least one updated or new root and/or intermediate CA certificate.

It will in the following be assumed that due to a LCM operation, CA certificates must be updated for, as an example, a service producer NF 107E. The service producer NF 107E thus updates its NF profile with a new value for the caCertificates attribute in step 1400

In step 1401, the service producer NF 107E sends an NFUpdate request to the NRF 106. The request indicates the new value for the caCertificates attribute, potentially with additional NF profile attributes that have changed. In some implementations, the complete NF profile is sent, in other implementations only the values of the attributes that have changed.

In step 1402, the NRF 106 stores the updated NF profile in data repository 106A and returns an NFUpdate response to the service produce NF 107E.

In step 1403, the NRF 106 determines all service consumer NFs 107D that have an active subscription to changes in the particular service producer NF 107E that sent the request message in step 1402, or generally to changes in the service producer NF types to which the particular service producer NF 107E that sent the request message in step 1402 belongs.

Then, for each service consumer NFs 107D determined in step 1403, the NRF 106 sends a NFStatusNotify request in step 1404. The request includes the modified caCertificates attribute received in step 1401 and indicates the identifier attribute of the service producer NF 107E associated therewith.

In step 1405, a particular service consumer NF 107D receives the request, and returns an NFStatusNotify response to the NRF 106. The response acknowledges proper receipt of the request.

Further, in step 1406, the service consumer NF 107D extracts the contents of the caCertificates attribute from the message received in step 1405 and stores them in the secure registry of the TLS implementation.

At the end of the signaling procedure illustrated in FIG. 5D, each concerned service consumer NF 107D has updated its CA certificate(s) as stored for the service producer NF 107E that initiated the procedure. In the other direction, also the service consumer NFs 107D update their respective caCertificates attribute, and service producer NFs 107E receive corresponding update notifications from the NRF 106 and update their respective secure registry of the TLS implementation accordingly. The same signaling procedure is applicable for changes in the identifier attribute of NF profiles of service consumer NFs 107D.

As has become apparent from FIGS. 5A to 5D, the extension of the NF profile with one or both of the caCertificates and identifier attributes results in various modifications of legacy signaling procedures. These modifications include the creation of an NF profile for an NF 107 with the caCertificates and/or identifier attributes (step 1100 in FIG. 5A and step 1400 in FIG. 5D), the storage of the CA certificates contained in the caCertificates attribute in the secure registry of the TLS implementation, and the storage of the identifier attribute internally (step 1203 in FIG. 5B and step 1406 in FIG. 5D), the lookup and match of the identifier attribute in the NF profile with the Subject Name and/or Subject Alternative Names fields of the client certificate (step 1308 in FIG. 5C), and others.

As will be appreciated, sending certificates and NF identifiers in the context of the above embodiments may expose security challenges if not done carefully. However, connections between the NFs 107 and the NRF 106 are protected using mTLS, therefore the CA certificates and NF identifiers exchanged during the registration, discovery, and notification signaling are protected from eavesdropping or tampering by potential attackers. Moreover, the NRF 106 is considered trusted, so it shall be implemented in a way that NF profiles contained therein cannot be disclosed or tampered by potential attackers.

The technique presented herein facilitates the distribution of cryptographic material (CA certificates) required to validate certificates used, for example, in connections secured with mTLS. It also provides a simple authorization method based on local policies (when not using token-based authorization) and typically requires no configuration on the different NFs. As a result, the operation of a 5G or similar system is facilitated, enabling easy scaling and reducing the probability of errors due to manual intervention and configuration errors.

It will be appreciated that the present disclosure has been described with reference to exemplary embodiments that may be varied in many aspects. As such, the present invention is only limited by the claims that follow.

The invention claimed is:

1. An apparatus configured to provide a network repository function, NRF, in a core network domain of a mobile communication network, the NRF being configured to register network function, NF, profiles for NF discovery, NF certificates having been issued to NFs, each NF certificate including a public key of the respective NF and at least one signature of at least one certification authority, CA, the at least one CA and the NRF being different, the apparatus being configured to:
receive, from a registering NF having an NF certificate, profile information comprising:
an NF identity of the registering NF,
an NF type of the registering NF,
at least one CA certificate of at least one CA that signed the NF certificate issued to the registering NF, the at least one CA certificate being usable to validate the NF certificate, and
an NF identifier issued to the registering NF that is different from the NF identity of the registering NF, the NF identifier being included in the NF certificate issued to the registering NF and identifying the registering NF in the at least one CA certificate; and
store the received profile information in a repository.

2. The apparatus of claim 1, wherein the NF identifier is included in a subject field of the NF certificate.

3. The apparatus of claim 1, wherein the NF identifier takes the form of one of a fully qualified domain name, FQDN, and a secure production identity framework for everyone, SPIFFE, identifier.

4. The apparatus of claim 1, wherein the NF identity makes the registering NF discoverable or distinguishable in the core network domain.

5. The apparatus of claim 1, configured to:
receive a discovery request indicating at least an NF type;
access the repository to identify one or more NF profiles matching at least the indicated NF type; and
send a discovery response including discovery information from the one or more matching NF profiles, the discovery information including at least the one or more CA certificates stored for the respective NF profile.

6. The apparatus of claim 1, configured to:
receive, from a first NF, an update request including updated CA certificate information; and
update the profile information of the first NF based with the updated CA certificate information.

7. The apparatus of claim 6, configured to:
identify one or more second NFs associated with the first NF via a subscription of notifications; and
send at least a portion of the updated CA certificate information to the one or more identified second NFs.

8. An apparatus configured to provide a network function, NF, in a core network domain of a mobile communication network, the core domain including a network repository function, NRF, configured to register network function, NF, profiles for NF discovery, an NF certificate having been issued to the NF, the NF certificate including a public key of the NF and at least one signature of at least one certification authority, CA, the at least one CA and the NRF being different, the apparatus being configured to:
obtain the at least one CA certificate of the at least one CA that signed the NF certificate issued to the NF;
send profile information the NRF, the profile information comprising:
an NF identity of the registering NF,
an NF type of the registering NF,
the at least one CA certificate, the at least one CA certificate being usable to validate the NF certificate, and
an NF identifier issued to the registering NF that is different from the NF identity of the registering NF, the NF identifier being included in the NF certificate issued to the registering NF and identifying the registering NF in the at least one CA certificate.

9. The apparatus of claim 8, configured to send, to another NF, the NF certificate in a handshake procedure with the other NF.

10. The apparatus of any of claim 8, configured to:
send, to the NRF, a discovery request indicating at least an NF type;
receive, from the NRF, a discovery response including discovery information from one or more NF profiles matching at least the NF type, the discovery information including the at least one CA certificate stored for the respective NF profile;
store the discovery information in a storage.

11. The apparatus of claim 10, configured to:
receive, from another NF for which discovery information has previously been received from the NRF 106, the NF certificate issued for that other NF;
read the at least one CA certificate included in the discovery information from the storage; and
validate the NF certificate using the CA certificate read from the storage.

12. The apparatus of claim 11, configured to:
extract a first NF identifier from the received NF certificate;
extract a second NF identifier from the profile information; and
validate the first NF identifier based on the second NF identifier.

13. The apparatus of claim 11, wherein the NF certificate is received in the context of a handshake procedure with the other NF.

14. The apparatus of claim 9, wherein the handshake procedure is based on the transport layer security, TLS, protocol.

15. The apparatus of claim 10, configured to:
receive, from the NRF, at least a portion of updated CA certificate information for an NF that is associated with the receiving NF via a subscription of notification and for which discovery information has been received and stored previously; and
update the stored discovery information based on the received updated CA certificate information.

16. The apparatus of claim 9, configured to:
determine updated CA certificate information for the NF; and
send, to the NRF, an update message including the updated CA certificate information for the NF.

17. The apparatus of claim 8, configured as one of a service consuming NF and a service producing NF.

18. A method of providing a network repository function, NRF, in a core network domain of a mobile communication network, the NRF being configured to register network function, NF, profiles for NF discovery, NF certificates having been issued to NFs, each NF certificate including a public key of the respective NF and at least one signature of at least one certification authority, CA, the at least one CA and the NRF being different, the method comprising:
receiving, from a registering NF having an NF certificate, profile information comprising:
an NF identity of the registering NF,
an NF type of the registering NF, and
at least one CA certificate of at least one CA that signed the NF certificate issued to the registering NF, the at least one CA certificate being usable to validate the NF certificate, and
an NF identifier issued to the registering NF that is different from the NF identity of the registering NF, the NF identifier being included in the NF certificate issued to the registering NF and identifying the registering NF in the at least one CA certificate; and
storing the received profile information in a repository.

* * * * *